United States Patent [19]
Jensen

[11] Patent Number: 5,727,452
[45] Date of Patent: Mar. 17, 1998

[54] PLANT FOR CONTINUOUSLY STERILISING FLUIDS, SUCH AS MILK AND CREAM

[75] Inventor: Jens Anders Jensen, Silkeborg, Denmark

[73] Assignee: APV Pasilac A/S, Silkeborg, Denmark

[21] Appl. No.: 836,643

[22] PCT Filed: Nov. 14, 1995

[86] PCT No.: PCT/DK95/00453

§ 371 Date: May 19, 1997

§ 102(e) Date: May 19, 1997

[87] PCT Pub. No.: WO96/15677

PCT Pub. Date: May 30, 1996

[30] Foreign Application Priority Data

Nov. 18, 1994 [DK] Denmark ................. 1319/94

[51] Int. Cl.$^6$ ................. A23C 1/12; A23L 3/34
[52] U.S. Cl. ................. 99/454; 99/452; 99/472; 99/516; 99/483
[58] Field of Search ................. 99/452–460, 472, 99/516, 470, 534–536, 483; 426/587, 492, 522, 399, 521

[56] References Cited

U.S. PATENT DOCUMENTS

| 4,008,657 | 2/1977 | Yamamura et al. | 99/483 |
|---|---|---|---|
| 4,161,909 | 7/1979 | Wakeman | 99/453 |
| 4,310,476 | 1/1982 | Nahra et al. | 99/453 X |
| 4,419,301 | 12/1983 | Nahra et al. | 99/483 X |
| 4,446,781 | 5/1984 | Schmitt | 99/517 X |
| 4,544,571 | 10/1985 | Nahra et al. | 99/454 |
| 4,591,463 | 5/1986 | Nahra et al. | 99/453 X |
| 4,689,237 | 8/1987 | Fabre | 426/522 X |
| 4,877,624 | 10/1989 | Floyd et al. | 99/454 |
| 4,921,717 | 5/1990 | Ranjith | 426/587 |
| 5,105,724 | 4/1992 | Swartzel et al. | 99/453 |
| 5,443,857 | 8/1995 | Arph et al. | 99/454 |
| 5,520,936 | 5/1996 | Delespaul et al. | 99/452 |

FOREIGN PATENT DOCUMENTS

| 1 105 387 | 3/1968 | United Kingdom . |
| 8706797 | 11/1987 | WIPO . |

*Primary Examiner*—Timothy F. Simone
*Attorney, Agent, or Firm*—Lowe, Price, LeBlanc & Becker

[57] ABSTRACT

A plant for continuously sterilizing fluids, such as milk and cream comprises a sterilizing device (2) in which the fluid is sterilized while steam is fed thereto, and a vacuum chamber (1) for removal of the water from the fluid and from which the fluid is extracted by means of a pump (8). The vacuum chamber (1) is accommodated before the sterilizing device (2) when seen in the flow direction of the fluid, said vacuum chamber (1) being connection to said sterilizing device (2) through a first heat exchanger (11) for heating the fluid before it enters said sterilizing device (2).

7 Claims, 1 Drawing Sheet

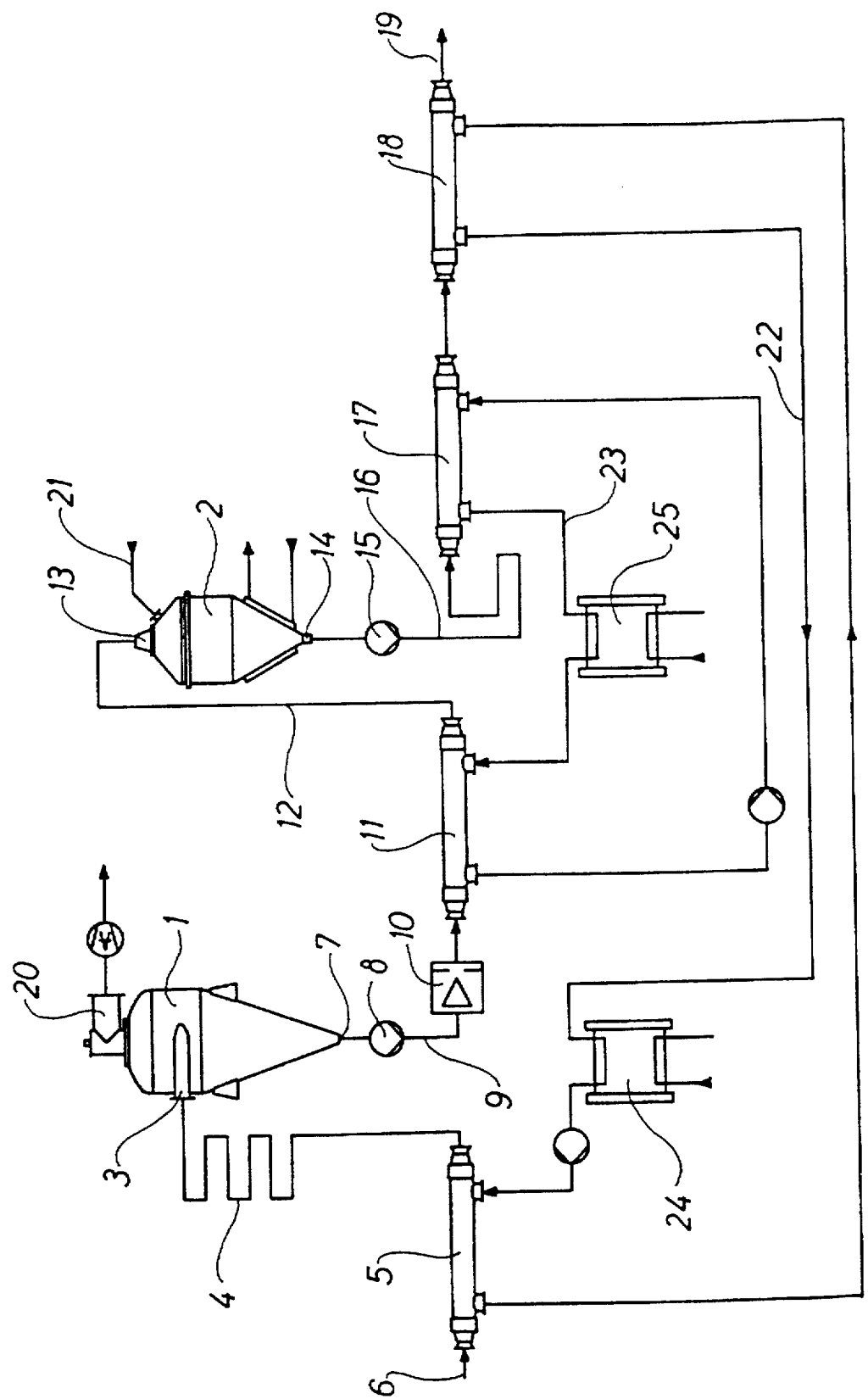

5,727,452

PLANT FOR CONTINUOUSLY STERILISING FLUIDS, SUCH AS MILK AND CREAM

TECHNICAL FIELD

The invention relates to a plant for continuously sterilising fluids, such as milk and cream, said plant comprising a sterilising device, in which the fluid is sterilised while steam is fed thereto, and a vacuum chamber for removing the water from the fluid and from which the fluid is extracted by means of a pump.

BACKGROUND ART

Inter alia AU-PS No. 610,233 discloses a plant for sterilising milk. Such a plant is known as a direct UHT-plant (Direct ultra high Temperature Plant). In these plants steam is sprayed into the milk fed to the sterilising device in such a manner that the milk is heated to a temperature of approximately 140° C. Subsequently, the milk is fed to a so-called holding chamber in which the milk is kept for a predetermined period (approximately 2 to 15 sec) in the heated state. Then the milk is carried to a vacuum chamber through an overflow. In this vacuum chamber the water deriving from the steam is removed again in such a manner that the solid content of the milk is the same when the milk leaves said vacuum chamber as before the feeding of steam. After the processing in the vacuum chamber, the milk is usually carried to a homogenizer and then subjected to a cooling and packing.

Plants are also known in which the sterilising is performed by way of a direct spraying of steam into the milk by means of a steam injector.

Such plants are relatively expensive to manufacture inter alia because the components must be aseptic after the heat treatment in the sterilising device. Precautionary measures must be taken everywhere in order to meet this requirement. It is inter alia a question of expensive gaskets with steam locks both in the vacuum chamber and in the remaining components following the sterilising device, such as the pump and the homogenizer.

BRIEF DESCRIPTION OF THE INVENTION

The object of the invention is to provide a plant which is less expensive to manufacture than hitherto known.

The plant according to the invention is characterised in that the vacuum chamber is accommodated before the sterilising device when seen in the flow direction of the fluid, said vacuum chamber being connected to said sterilising device through a first heat exchanger for heating the fluid before said fluid enters the sterilising device.

In this manner a significant reduction of the number of components following the sterilising is obtained. In the vacuum chamber the water is removed from the fluid in question in such a manner that said fluid is further concentrated, and in the sterilising device this amount of water is readded through the steam. Like in the known plant, the temperatures and the removal and adding of water is controlled in such a manner that the concentration of solid matter in the fluid in question is the same at the outlet of the plant as at the inlet of said plant. As the vacuum chamber and the associated components are arranged before the sterilising device, no requirements concerning aseptic measures are presented to this section of the plant with the result that the entire plant is less expensive to manufacture than hitherto known.

According to the invention a homogenizer may be coupled between the pump at the outlet of the vacuum chamber and the first heat exchanger with the result that the plant is particularly suited for treating milk. The arranging of the homogenizer before the sterilising device implies furthermore that the requirement to said homogenizer being aseptic no longer applies. Therefore, the homogenizer can also be manufactured relatively inexpensive.

According to the invention the first heat exchanger may advantageously be adapted to heat the fluid to a temperature from approximately 115° C. to approximately 120° C. before said fluid is carried to the sterilising device with the result that said sterilising device operates optimally. Correspondingly, in order to ensure that a corresponding concentration of the fluid is carried out in the vacuum chamber, a second heat exchanger may according to the invention advantageously be arranged before said vacuum chamber when seen in the flow direction of the fluid, said second heat exchanger heating the fluid to a temperature from approximately 90° C. to approximately 100° C. before said fluid enters the vacuum chamber. Furthermore, a relatively long tube may be arranged between the above second heat exchanger and the vacuum chamber. This tube ensures a suitable stay period of the fluid at the temperature in question before said fluid is carried to the vacuum chamber. When it is a question of milk, a suitable stabilization is here carried out of the protein content thereof. The outlet of the sterilising device is often connected to a pump in order to ensure a quick removal of the fluid from said sterilising device and a transfer thereof to a holding chamber. According to the invention the outlet of this pump may be connected to a third heat exchanger for cooling the fluid by means of a relatively long tube serving as a holding chamber. The heat exchanger ensures a quick cooling down again of the fluid when said fluid has stayed in the holding chamber for a suitably short period at the high temperature of approximately 140° C.

Finally, the third heat exchanger may according to the invention suitably be a twostage heat exchanger lowering the temperature of the fluid to approximately 25° C. In this manner the stages of the third heat exchanger can suitably be adapted to cooperate in sequence with the first and the second heat exchanger, respectively.

BRIEF DESCRIPTION OF THE DRAWING

The invention is explained in greater detail below with reference to the accompanying drawing showing a diagrammatic view of a plant for sterilising milk or cream.

BEST MODE FOR CARRYING OUT THE INVENTION

This plant comprises a vacuum chamber 1 and a sterilising tank 2, both parts being of a conventionally known type. The inlet 3 of the vacuum chamber 1 is connected through a suitably long tube 4 to a heat exchanger 5, which in turn is connected to a source with non-sterilised milk or cream through a tube 6. The outlet 7 of the vacuum chamber is connected to a centrifugal pump 8, the outlet of which in turn is connected to a tube 9 communicating with a heat exchanger 11 through a homogenizer 10 of a conventionally known type. This heat exchanger 11 is connected through a tube 12 of a suitable length to the inlet 13 of the sterilising tank 2. The outlet 14 of the sterilising tank 2 is connected to a centrifugal pump 15 and thereby through a tube 16 of a suitable length to two succeeding heat exchangers 17 and 18. The latter heat exchanger 18 is through a tube 19 connected to components (not shown) for further treatment of sterilised milk or cream.

When the plant is used for sterilising milk, non-sterilised raw milk is carried at a temperature of approximately 5° C. through the tube 6 to the heat exchanger 5, in which the temperature of the milk is raised to approximately 90° to 100° C. From this heat exchanger 5, the fluid flows through the relatively long tube 4 to the vacuum chamber 1, the length of said tube 4 being adapted in such a manner that the stay of the milk therein is approximately 30 sec with the result that a suitable stabilisation of the protein is ensured before the milk reaches the vacuum chamber 1. In the vacuum chamber, the water is boiled off as a consequence of the drop in pressure which the milk is subjected to therein. The temperature of the milk drops to approximately 75° C. at the outlet of the vacuum chamber 1 while the water steam is drained off in a conventionally known manner through the tube 20. The resulting further concentrated milk is carried quickly out of the vacuum chamber by means of the centrifugal pump 8 and subsequently to the homogenizer 10. Subsequently, the concentrated milk passes through the heat exchanger 11, in which the temperature is raised to approximately 115° C. to approximately 120° C. From the heat exchanger 11, the milk continues through the tube 12 to the sterilising tank 12 in which the concentrated milk is subjected to a sterilising while directly supplied with steam through a tube 21, cf. the above AU-PS No. 610,233. In the sterilising tank 2 the milk is heated to a temperature of approximately 140° C. and then carried quickly out thereof by means of the centrifugal pump 15 so as to stay for a few sec. in the tube 16 before it is carried through the heat exchangers 17 and 18. In the heat exchanger 17, the temperature is lowered to approximately 85° C., and in the heat exchanger 18 the temperature is lowered to approximately 25° C. In the tube 16, the centrifugal pump 15 ensures that the sterilised milk is kept at a relatively high pressure in such a manner that possible steam is absorbed in the milk.

The temperatures in question and the control of the vacuum chamber as well as the sterilising tank are observed in such a manner that it is ensured that the amount of water fed into the sterilising tank 2 is the same as the amount of water removed in the vacuum chamber 1.

As illustrated in the drawing, the heat exchangers 15 and 18 cooperate through a fluid circuit 22, and the heat exchangers 11 and 17 cooperate through a fluid circuit 23 in such a manner that the energy used is utilized to an optimum. Suitable heat exchangers 24 and 25, respectively, are coupled between the above fluid circuits 22 and 23, said heat exchangers ensuring that the necessary temperatures are maintained by means of steam.

The invention has been described with reference to a preferred embodiment. When the plant is used for treating other fluids beyond milk, such as products for the production of dessert, cream etc., the homogenizer 10 can be omitted.

Instead of a sterilising tank 2 of the type known from AU-PS No. 610,233, it is possible to use a steam injector for spraying steam directly into a stream of milk.

Many modifications of the plant can be carried out without thereby deviating from the scope of the invention.

I claim:

1. A plant for continuously sterilising fluids, such as milk and cream, said plant comprising a sterilising device, in which the fluid is sterilised while steam is fed thereto, and a vacuum chamber for removing the water from the fluid and from which the fluid is extracted by means of a pump, characterised in that the vacuum chamber (1) is accommodated before the sterilising device (2) when seen in the flow direction of the fluid, said vacuum chamber (1) being connected to said sterilising device (2) through a first heat exchanger (11) for heating the fluid before said fluid enters the sterilising device (2).

2. A plant as claimed in claim 1, characterised in that a homogenizer (10) is provided between the pump (8) at the outlet (7) of the vacuum chamber (1) and the first heat exchanger (11).

3. A plant as claimed in claim 1, characterised in that the first heat exchanger (11) is adapted to heat the fluid to a temperature of from approximately 115° C. to approximately 120° C. before said fluid is carried to the sterilising device (2).

4. A plant as claimed in claim 1, characterised in that a second heat exchanger (5) is provided before the vacuum chamber (1) when seen in the flow direction of the fluid, said second heat exchanger heating the fluid to a temperature from approximately 90° C. to approximately 100° C. before it is carried to the vacuum chamber (1), and that a relatively long tube (4) is provided between said second heat exchanger (5) and said vacuum chamber (1).

5. A plant as claimed in claim 1, and where a second pump (15) is provided after the sterilising device (2) when seen in the flow direction of the fluid, said second pump sucking out the fluid from said sterilising device (2), characterised in that the outlet of said second pump (15) is connected to a third heat exchanger (17, 18) for cooling the fluid through a relatively long tube (16).

6. A plant as claimed in claim 5, characterised in that the third heat exchanger (17, 18) is a twostage heat exchanger lowering the temperature of the fluid to approximately 25° C.

7. A plant as claimed in claim 1, characterised in that the sterilising device is a steam injector.

* * * * *